United States Patent
Anegawa et al.

(10) Patent No.: US 10,683,039 B2
(45) Date of Patent: Jun. 16, 2020

(54) VEHICLE BODY STRUCTURE

(71) Applicant: HONDA MOTOR CO., LTD., Tokyo (JP)

(72) Inventors: Shota Anegawa, Wako (JP); Takatsugu Kawasaki, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 67 days.

(21) Appl. No.: 16/194,828

(22) Filed: Nov. 19, 2018

(65) Prior Publication Data

US 2019/0176896 A1 Jun. 13, 2019

(30) Foreign Application Priority Data

Dec. 11, 2017 (JP) ................................. 2017-237083

(51) Int. Cl.
*B62D 25/08* (2006.01)
*B62D 25/16* (2006.01)

(52) U.S. Cl.
CPC ........... *B62D 25/081* (2013.01); *B62D 25/16* (2013.01)

(58) Field of Classification Search
CPC ... B60J 1/004; B60J 1/007; B60J 1/02; B62D 25/081
USPC ............................................. 296/190.1, 192
See application file for complete search history.

(56) References Cited

U.S. PATENT DOCUMENTS

| 5,145,457 | A | * | 9/1992 | Tanigaito | B60H 1/28 296/192 |
| 8,491,043 | B2 | | 7/2013 | Yamagishi et al. | |
| 9,745,000 | B2 | * | 8/2017 | Barreiro | B62D 25/081 |
| 2005/0134089 | A1 | * | 6/2005 | Borkowski | B62D 25/081 296/192 |
| 2006/0202516 | A1 | * | 9/2006 | Mori | B60S 1/52 296/192 |
| 2008/0246311 | A1 | * | 10/2008 | Hagino | B60H 1/28 296/192 |
| 2009/0058139 | A1 | * | 3/2009 | Izawa | B60R 13/04 296/192 |
| 2014/0117722 | A1 | * | 5/2014 | Lacroix | B60R 13/07 296/208 |

FOREIGN PATENT DOCUMENTS

| EP | 1787869 A1 | * | 5/2007 | ........... B62D 25/081 |
| JP | 5364792 B | | 12/2013 | |

* cited by examiner

*Primary Examiner* — Jason S Daniels
(74) *Attorney, Agent, or Firm* — Thomas | Horstemeyer, LLP

(57) ABSTRACT

A vehicle body structure comprising a cowl top garnish arranged along a windshield, wherein the cowl top garnish comprises an upper portion extending along the windshield, a side portion extending downward from an end portion of the upper portion in a vehicle width direction, and a drain recessed downward along an end portion of the upper portion on a front side of a vehicle body and extending in the vehicle width direction, the drain comprises an open end at an end portion in the vehicle width direction, and the side portion comprises a drain rib extending from the open end in rear and lower directions of the vehicle body.

5 Claims, 6 Drawing Sheets

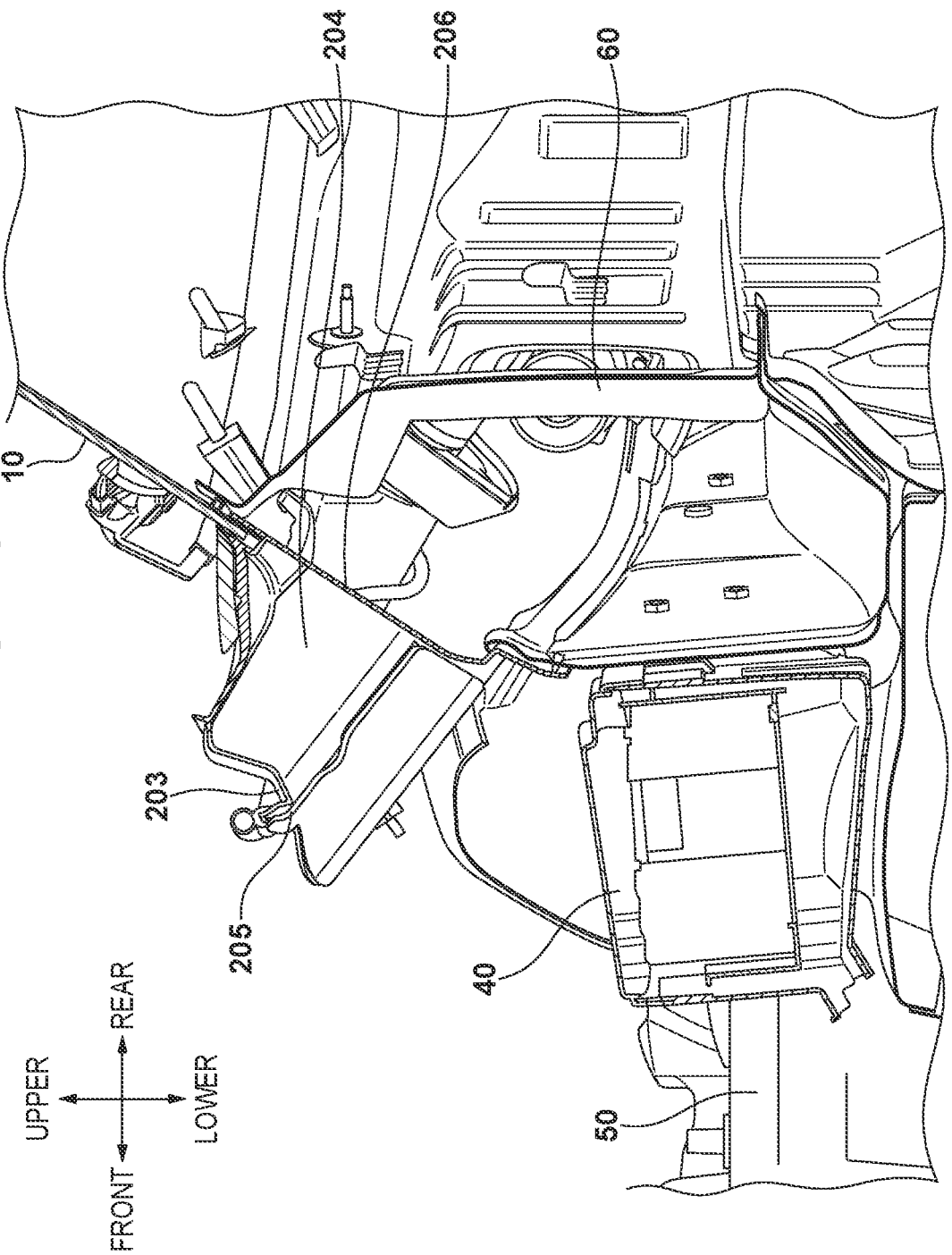

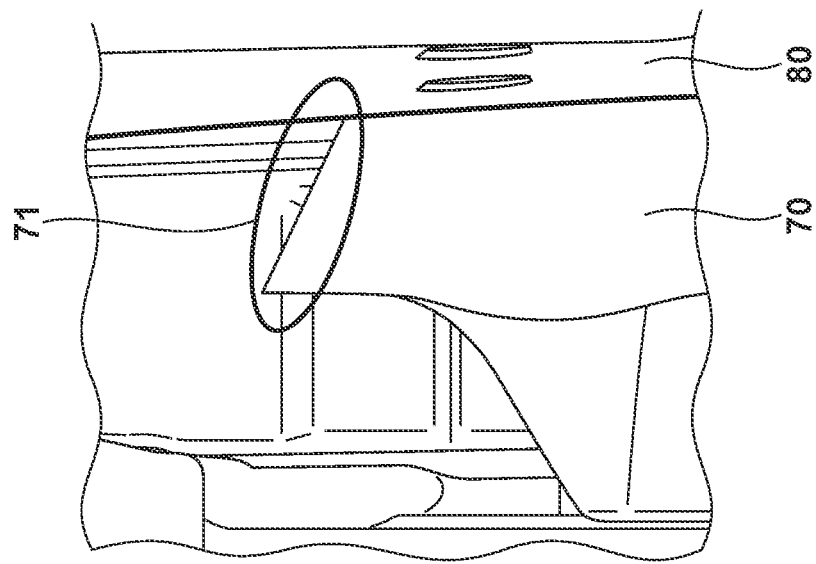
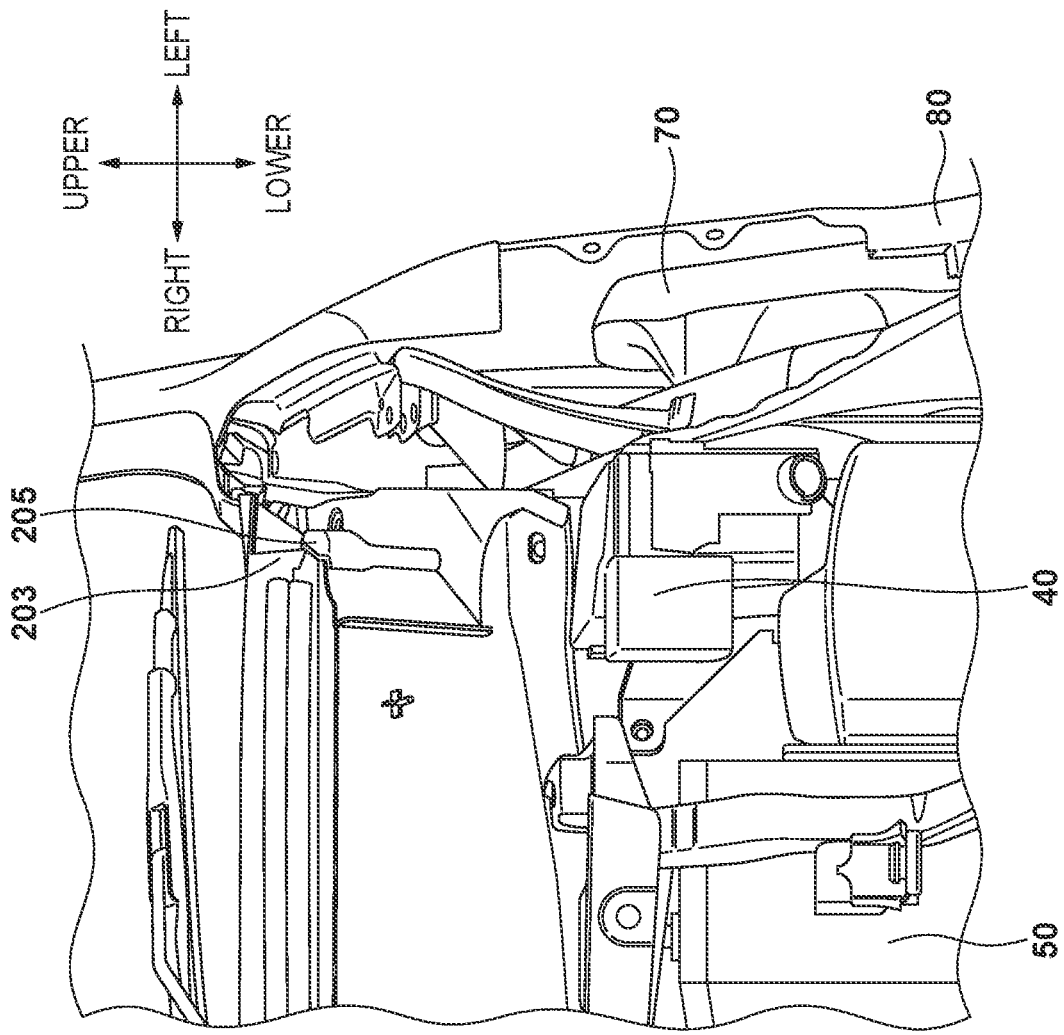

VEHICLE BODY STRUCTURE

CROSS-REFERENCE TO RELATED APPLICATION(S)

This application claims priority to and the benefit of Japanese Patent Application No. 2017-237083 filed on Dec. 11, 2017, the entire disclosure of which is incorporated herein by reference.

BACKGROUND OF THE INVENTION

Field of the Invention

The present invention relates to a vehicle body structure.

Description of the Related Art

Japanese Patent No. 5364792 discloses a structure in which a drain is disposed on the upper surface side of a cowl top, and the drain is open without forming a side wall at the end portion of the drain in the vehicle width direction. When the end portion of the drain is open, a trouble in which water is excessively stored in the drain and flows to an unexpected location can be prevented.

However, if a functional component supposed to be prevented from wetting with water exists below the drain, water drops immediately below the end portion of the drain if the flow speed of water from the end portion of the drain is low. The dropped water is splashed to wet the functional component.

The present invention has been made in consideration of the above problem and provides a technique for preventing wetting of the functional component with water.

SUMMARY OF THE INVENTION

According to one aspect of the present invention, there is provided a vehicle body structure comprising a cowl top garnish arranged along a windshield, wherein the cowl top garnish comprises an upper portion extending along the windshield, a side portion extending downward from an end portion of the upper portion in a vehicle width direction, and a drain recessed downward along an end portion of the upper portion on a front side of a vehicle body and extending in the vehicle width direction, the drain comprises an open end at an end portion in the vehicle width direction, and the side portion comprises a drain rib extending from the open end in rear and lower directions of the vehicle body.

BRIEF DESCRIPTION OF THE DRAWINGS

FIG. 3 is a view obtained by observing the vehicle body structure according to the embodiment from the left lateral side of the vehicle body;

FIG. 6A is a view obtained by observing the vehicle body structure according to the embodiment from the front side of the vehicle body toward the rear side of the vehicle body; and FIG. 6B is an enlarged view near a fender panel and a fender stiffener.

DESCRIPTION OF THE EMBODIMENTS

Figure 1:
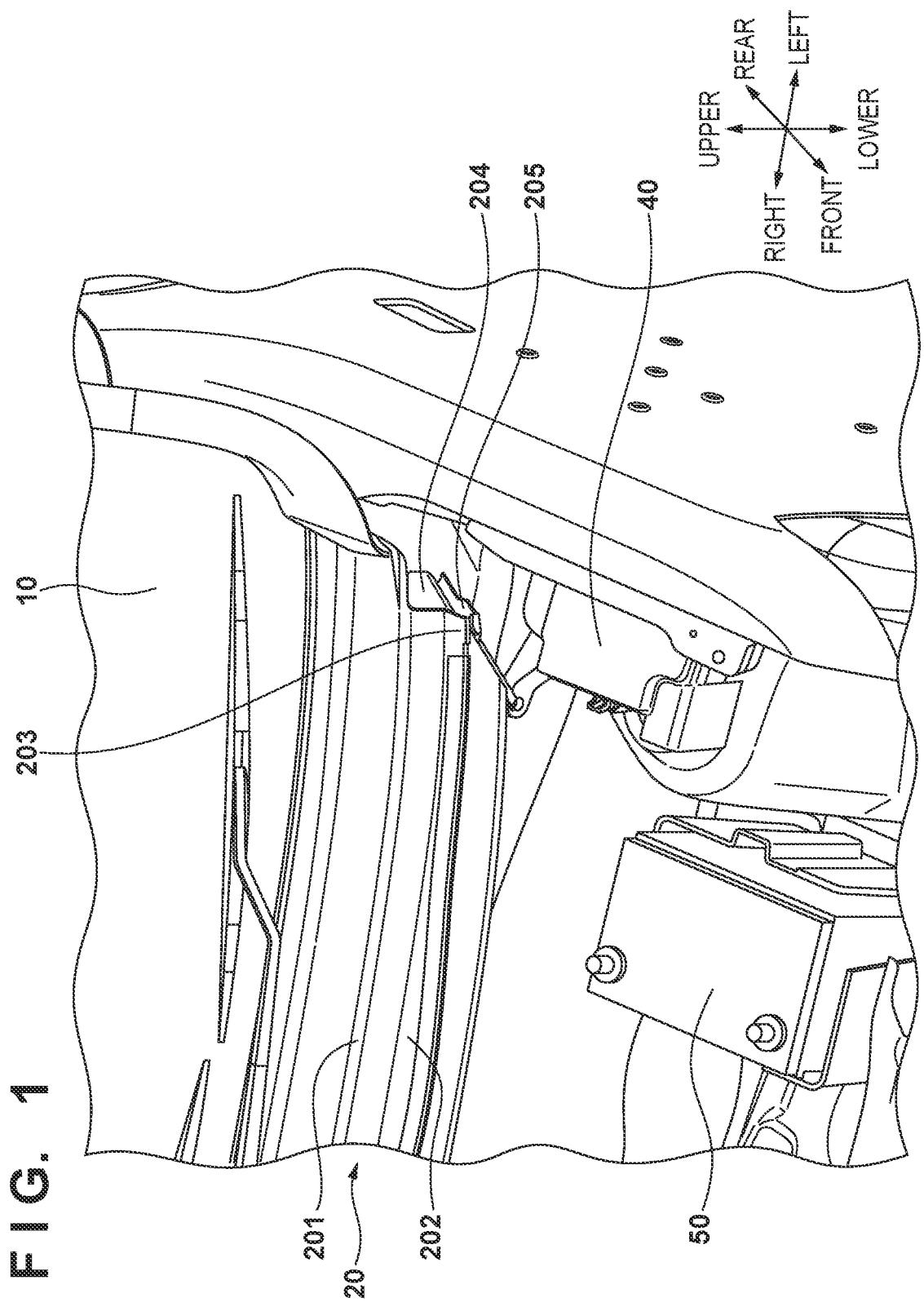
FIG. 1 is a view obtained by observing a vehicle body structure according to an embodiment from the left front side of a vehicle body.

An embodiment of the present invention will be described below with reference to the accompanying drawings. Note that the same reference numerals throughout the accompanying drawings denote the same parts. The terms of the upper, lower, front, rear, left, and right sides represent the upper, lower, front, rear, left lateral, and right lateral directions, respectively.

Figure 2:
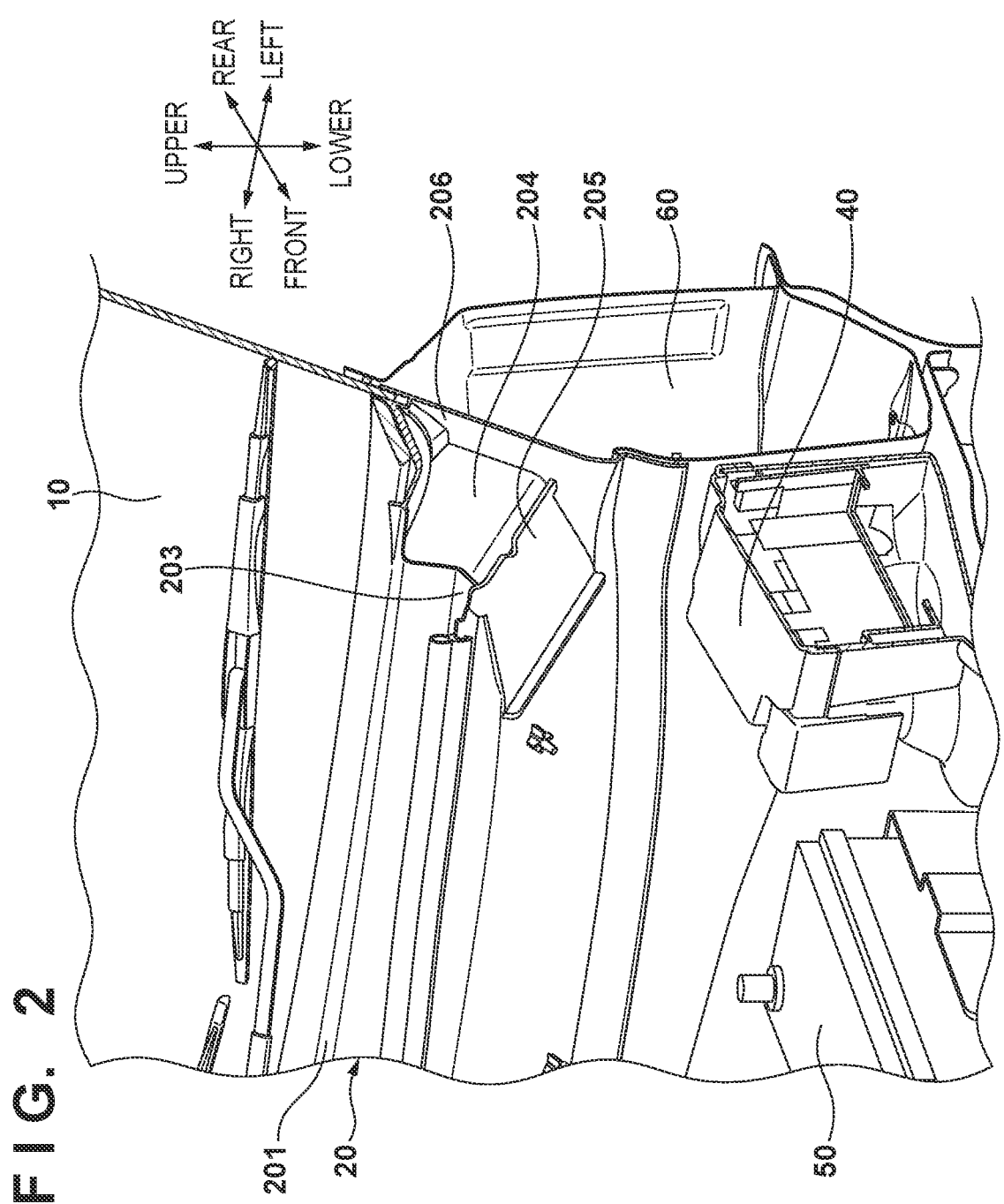
FIG. 2 is a view obtained by observing the vehicle body structure according to the embodiment from the farther left lateral side of the vehicle body than that in FIG. 1.

A vehicle body structure according to the embodiment will be described with reference to FIGS. 1 to 3. FIG. 1 is a view obtained by observing a vehicle body near the left front side of a vehicle body. FIG. 2 is a view obtained by observing the vehicle body from the farther left lateral side of the vehicle body than that in FIG. 1. FIG. 3 is a view obtained by observing the vehicle body structure according to the embodiment from the left lateral side of the vehicle body. Referring to FIGS. 1 to 3, reference numeral 10 denotes a windshield; and 20, a cowl top garnish arranged along the windshield 10. Reference numeral 201 denotes an upper portion of the cowl top garnish 20 extending along the windshield 10. Reference numeral 202 denotes a drain recessed downward along the end portion of the front side of the upper portion 201 of the cowl top garnish 20 toward the front side of the vehicle body and extending in the vehicle width direction. Reference numeral 203 denotes an open end formed at the end portion of the drain 202 in the vehicle width direction. Water flowing along the drain 202 is drained from the open end 203.

Reference numeral 204 denotes a side portion extending downward from the end portion (of the vehicle width direction) of the upper portion 201 of the cowl top garnish 20. The side portion 204 extends from the lateral side to the lower side of the cowl top garnish 20. Reference numeral 205 denotes a drain rib extending from the open end 203 toward the rear and lower sides of the vehicle body and formed near the center of the side portion 204. Water drained from the open end 203 is guided toward the rear side and the lower side along the drain rib 205. Reference numeral 40 denotes a fuse box arranged almost below the open end 203. Reference numeral 50 denotes a battery serving as a functional component supposed to be prevented from wetting with water. By arranging the drain rib 205, water can be prevented from being dropped directly below from the open end 203 and being scattered on the upper surface of the fuse box 40, thereby preventing the battery 50 from wetting with water.

As shown in FIGS. 2 and 3, reference numeral 60 denotes a cowl portion arranged below the windshield 10 and having an upper opening. The sectional shape of the cowl portion 60 is an almost U shape. Reference numeral 206 denotes a lid portion which is part of the cowl top garnish 20 and covers the opening of the cowl portion 60. Note that the lid portion 206 may be formed as part of the cowl portion 60. The drain rib 205 extends from the open end 203 toward the lid portion 206 in the rear and lower directions of the vehicle body. In this manner, since the water is guided from the open end to the lid portion, the water can be guided from the lid portion along the vehicle body and dropped, thereby preventing the water from being splashed and scattered.

Figure 4A:
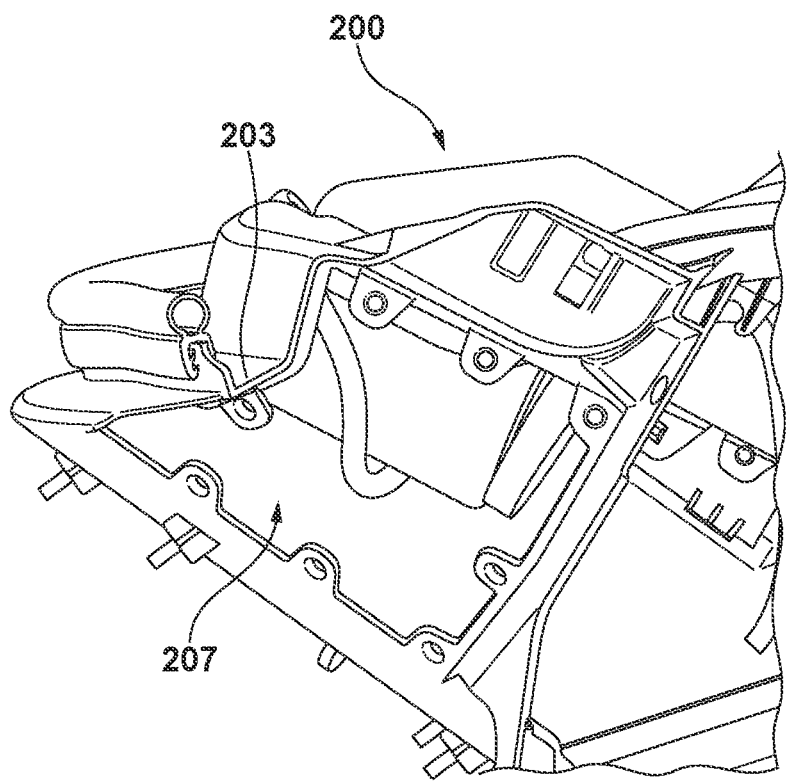
FIG. 4A is an enlarged view near the side portion of a cowl top garnish when the vehicle structure according to the embodiment is observed from the left lateral side (with a cover member)
Figure 4B:
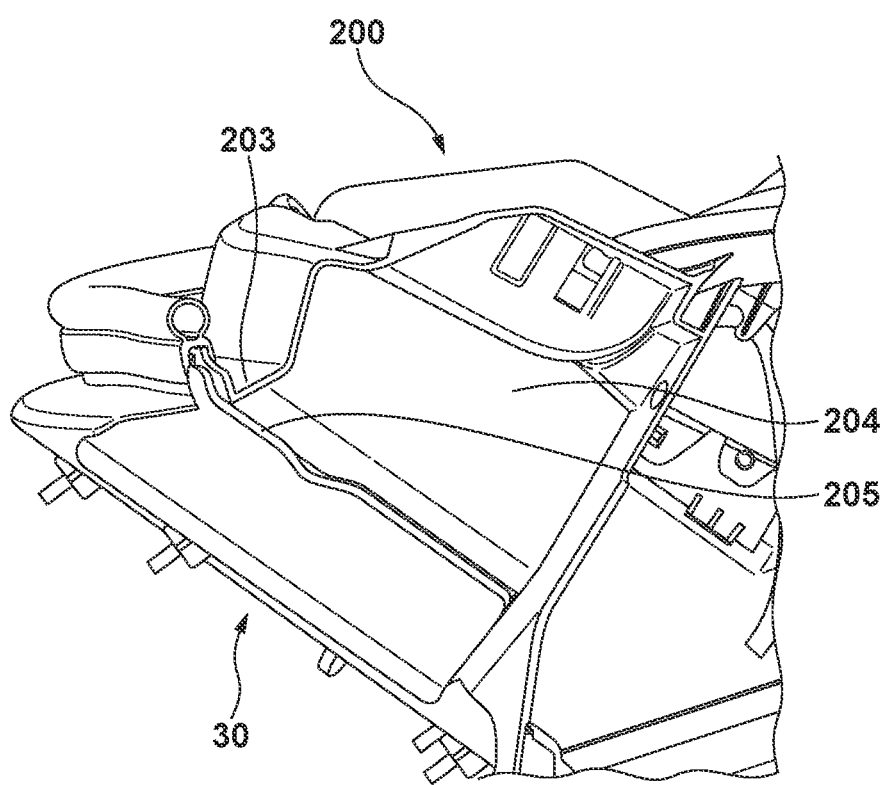
FIG. 4B is an enlarged view near the side portion of the cowl top garnish when the vehicle structure according to the embodiment is observed from the left lateral side (without the cover member)

Next, FIGS. 4A and 4B are enlarged views near the side portion of the cowl top garnish when the vehicle body structure according to the embodiment is observed from the left lateral side. FIG. 4B is a view showing a state in which the cover member is removed from the state in FIG. 4A. The cowl top garnish 20 is configured to include a main body member 200 and a cover member 30 made of a material softer than that of the main body member 200. In this case, the cover member 30 is a member including the side portion 204, and the main body member 200 is a member including the upper portion 201, the drain 202, and the like as members other than the cover member 30. As shown in FIG. 4A, the main body member 200 includes an opening 207 on the lateral side. As shown in FIG. 4B, the cover member 30 is formed so as to cover the opening 207. As described above, by forming the opening in the side portion of the cowl top garnish, the side portion allows deformation of the main body member when a load acts on the vehicle body from the above, thereby efficiently absorbing the energy. Since the cover member is made of the material softer than the main body member, the cover member covering the opening and allows deformation of the main body member.

In addition, in this example, the drain rib 205 is formed as part of the cover member 30. By forming the drain rib in the cover member as described above, a sliding mold for the drain rib need not be used, thereby improving the moldability of the main body member.

Figure 5:
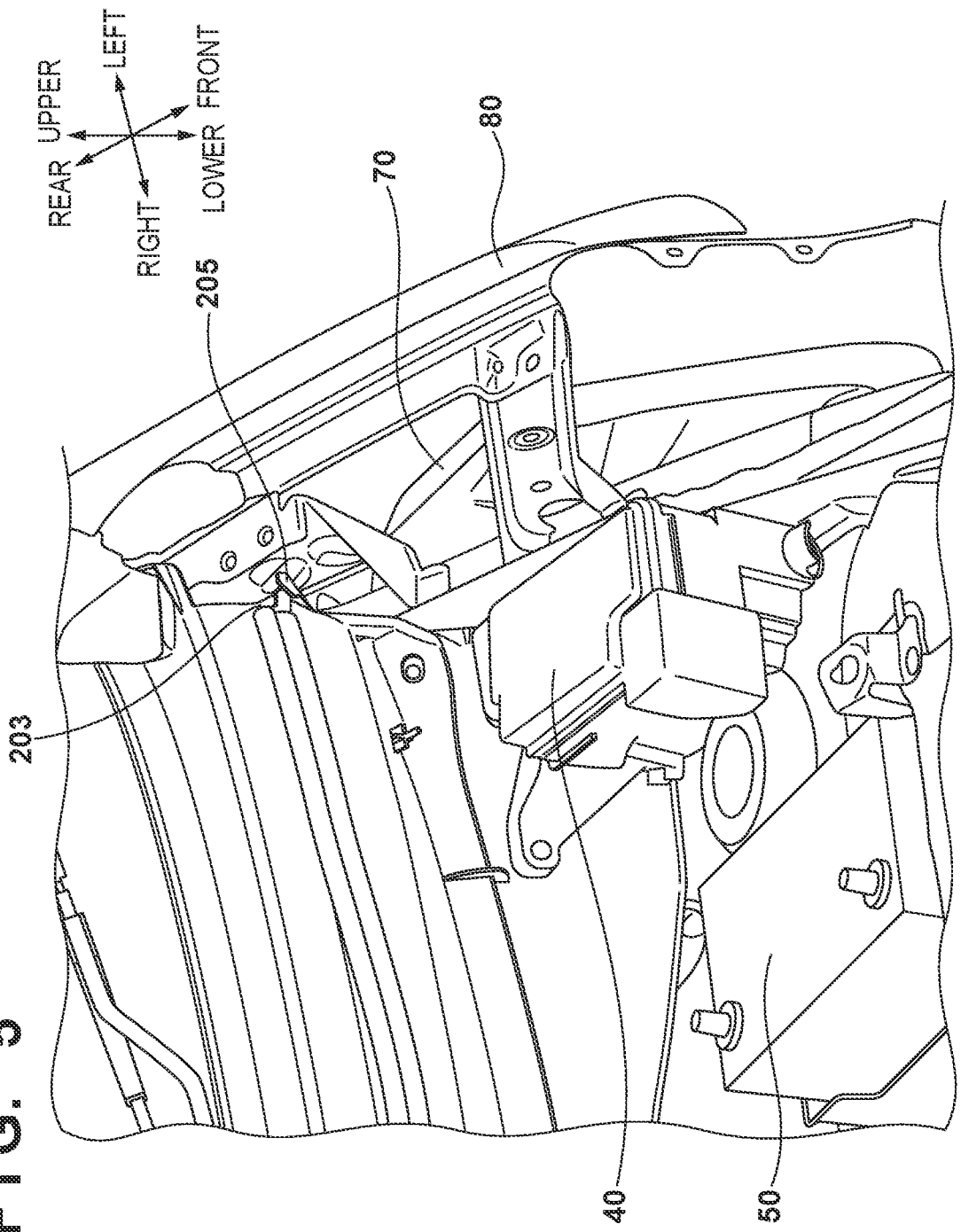
FIG. 5 is a view obtained by observing the vehicle body structure according to the embodiment from the front side of the vehicle body toward the left lateral side of the vehicle body.

Subsequently, the structures of a fender panel and a fender stiffener of the vehicle body structure according the embodiment will be described with reference to FIGS. 5, 6A, and 6B. FIG. 5 is a view obtained by observing the vehicle body structure according to the embodiment from the front side of the vehicle body toward the left lateral side of the vehicle body. FIG. 6A is a view obtained by observing the vehicle body structure according to the embodiment from the front side of the vehicle body toward the rear side of the vehicle body. FIG. 6B is an enlarged view near the fender panel and the fender stiffener in FIG. 6A.

Reference numeral 80 denotes a fender panel arranged on the outer side farther than the open end 203 of the drain 202 in the vehicle width direction. Reference numeral 70 denotes a fender stiffener arranged on the inner side farther than the fender panel 80 in the vehicle width direction. Reference numeral 71 denotes an upper surface of the fender stiffener 70. The upper surface 71 of the fender stiffener 70 is located below the open end 203 and formed such that the upper surface 71 is more inclined downward toward the outer side in the vehicle width direction. With this arrangement, even if water strongly drained from the open end of the drain flows along the lower surface of the fender panel, the inclination of the upper surface of the fender stiffener can prevent the water from being splashed inside in the vehicle width direction. That is, since the water drained outside from the open end 203 in the vehicle width direction flows and drops through the gap between the fender stiffener 70 and the fender panel 80, the water will not be splashed on the inner portion of the vehicle width direction where the functional components such as the battery 50 exist.

Note that the above embodiment is merely an example of the present invention. The present invention is applicable to an arrangement in which the embodiment is changed and modified without departing from the scope of the present invention. As a matter of course, the vehicle body structure according to the embodiment is applicable to a vehicle other than an automobile.

SUMMARY OF EMBODIMENT

1. A vehicle body structure according to the above embodiment is a vehicle body structure comprising a cowl top garnish (for example, 20) arranged along a windshield (for example, 10),
wherein the cowl top garnish comprises
an upper portion (for example, 201) extending along the windshield,
a side portion (for example, 204) extending downward from an end portion of the upper portion in a vehicle width direction, and
a drain (for example, 202) recessed downward along an end portion of the upper portion on a front side of a vehicle body and extending in the vehicle width direction,
the drain comprises an open end (for example, 203) at an end portion in the vehicle width direction, and
the side portion comprises a drain rib (for example, 205) extending from the open end in rear and lower directions of the vehicle body.

According to this embodiment, since the water dropped from the open end of the drain can be received by the drain rib, and guided and drained, the functional component arranged below the cowl top garnish can be prevented from wetting with water.

2. The vehicle body structure according to the embodiment further comprises a cowl portion (for example, 60) arranged below the windshield (for example, 10) and having an upper opening,
the cowl top garnish (for example, 20) further comprises a lid portion (for example, 206) configured to cover the opening of the cowl portion, and the drain rib (for example, 205) extends from the open end toward the lid portion in rear and lower directions of the vehicle body.

According to this embodiment, since the water can be guided from the open end to the lid portion, the water can be dropped from the lid portion along the vehicle body, thereby preventing the water from being splashed and scattered.

3. In the vehicle body structure according to the embodiment, the cowl top garnish (for example, 20) comprises a cover member (for example, 30) including the side portion and a main body member (for example, 200) including the upper portion and the drain, the main body member (for example, 200) includes an opening (for example, 207) at a lateral portion, and the cover member (for example, 30) is formed to cover the opening and made of a member softer than the main body member.

According to this embodiment, since the opening is formed in the side portion, the side portion allows the main body member to deform when a load acts on the vehicle body from the above, thereby efficiently absorbing the energy. In addition, since the cover member is softer than the main body member, even if the cover member covers the opening, the cover member allows deformation of the main body member.

4. In the vehicle body structure according to the embodiment, the drain rib (for example, 205) is formed as part of the cover member (for example, 30).

According to this embodiment, since the drain rib is formed in the cover member, and the sliding mold for the drain rib need not be used, the moldability of the main body member can be improved.

5. The vehicle body structure according to the above embodiment further comprises a fender panel (for example, 80) arranged on an outer side farther than the open end (for example, 203) of the drain (for example, 202) in the vehicle width direction, and a fender stiffener (for example, 70) arranged on an inner side nearer than the fender panel in the vehicle width direction, wherein an upper surface of the fender stiffener is arranged below the open end and inclined downward more on the outer side in the vehicle width direction.

According to this embodiment, even if water strongly drained from the open end of the drain flows along the lower surface of the fender panel, the inclination of the upper surface of the fender stiffener can prevent the water from being splashed inside in the vehicle width direction.

According to the present invention, the functional component can be prevented from wetting with water.

What is claimed is:

1. A vehicle body structure comprising a cowl top garnish arranged along a windshield,
    wherein the cowl top garnish comprises
    an upper portion extending along the windshield,
    a side portion extending downward from an end portion of the upper portion in a vehicle width direction, and
    a drain recessed downward along an end portion of the upper portion on a front side of a vehicle body and extending in the vehicle width direction,
    the drain comprises an open end at an end portion in the vehicle width direction, and
    the side portion comprises a drain rib extending from the open end in rear and lower directions of the vehicle body.

2. The structure according to claim 1, further comprising a cowl portion arranged below the windshield and having an upper opening,
    wherein the cowl top garnish further comprises a lid portion configured to cover the opening of the cowl portion, and
    the drain rib extends from the open end toward the lid portion in rear and lower directions of the vehicle body.

3. The structure according to claim 1, wherein
    the cowl top garnish comprises a cover member including the side portion and a main body member including the upper portion and the drain,
    the main body member includes an opening at a lateral portion, and
    the cover member is formed to cover the opening and made of a member softer than the main body member.

4. The structure according to claim 3, wherein the drain rib is formed as part of the cover member.

5. The structure according to claim 1, further comprising
    a fender panel arranged on an outer side farther than the open end of the drain in the vehicle width direction, and
    a fender stiffener arranged on an inner side nearer than the fender panel in the vehicle width direction,
    wherein an upper surface of the fender stiffener is arranged below the open end and inclined downward more on the outer side in the vehicle width direction.

\* \* \* \* \*